United States Patent [19]

Omoto et al.

[11] Patent Number: 5,152,577
[45] Date of Patent: Oct. 6, 1992

[54] VEHICLE WITH FLEXIBLE TOP OPENABLE AT ITS FRONT OR REAR PORTION

[75] Inventors: Seiichi Omoto; Kenji Matsumoto, both of Hiroshima, Japan

[73] Assignee: Mazda Motor Corporation, Hiroshima, Japan

[21] Appl. No.: 619,505

[22] Filed: Nov. 29, 1990

[30] Foreign Application Priority Data

Nov. 29, 1989 [JP] Japan .................... 1-311922

[51] Int. Cl.⁵ .............................. B60J 7/06
[52] U.S. Cl. .................... 296/219; 296/223
[58] Field of Search .............. 296/216, 219, 223

[56] References Cited

U.S. PATENT DOCUMENTS 2,103,372 12/1937 Lange ............... 296/223 X
4,838,607 6/1989 Mizuma et al. ........... 296/219

FOREIGN PATENT DOCUMENTS 382186 8/1990 European Pat. Off. ....... 296/219
382187 8/1990 European Pat. Off. ....... 296/223
37531 2/1986 Japan .
40228 3/1988 Japan .
1011473 12/1965 United Kingdom .

*Primary Examiner*—Dennis H. Pedder
*Assistant Examiner*—Andrew C. Pike
*Attorney, Agent, or Firm*—Fish & Richardson

[57] ABSTRACT

A flexible top vehicle or canvas top vehicle is provided with a flexible top or canvas top made of a flexible member so as to cover its roof opening. The flexible top is so disposed as to allow both of its front end and rear end to be transferred forwards or rearwards. The front end of the flexible top is associated with a first driving motor while the rear end thereof is associated with a second driving motor. The first and second driving motors are arranged to be operated by turning a forward-moving switch or a rearward-moving switch on, thereby transferring the flexible top placed in a middle position of the roof opening in a folded state in forward and rearward directions. The flexible top maintains its folded state prior to transfer even after it has been transferred.

7 Claims, 12 Drawing Sheets

VEHICLE WITH FLEXIBLE TOP OPENABLE AT ITS FRONT OR REAR PORTION

BACKGROUND OF THE INVENTION

1. Field of the Invention

The present invention relates to a flexible top vehicle or a canvas top vehicle, or a vehicle with a flexible top or with a canvas top, and, more particularly, to a flexible top vehicle in which the flexible top composed of a flexible member is so disposed as to open or cover a roof opening of the roof by folding or extending the flexible top from or to both end portions thereof.

2. Description of Related Art

A canvas top vehicle, or a flexible top vehicle, is known which has a roof opening at a central portion of a roof of the vehicle body, which is surrounded by a front header, a rear header, and roof side rails and which has a canvas top or a flexible top, composed of a flexible sheet material, disposed so as to be foldable to thereby open or cover the roof opening of the roof.

Such a canvas top vehicle is designed such that the canvas top or flexible top is generally accommodated in a backward position of the roof. For example, as disclosed in Japanese Utility Model Unexamined Publication (kokai) No. 40,228/1988, the flexible top disposed at the roof opening of the roof of the vehicle body is arranged such that a rearward end of the flexible top is fixed to the rear header of the roof opening and a forward portion of the flexible top is folded or extended in a longitudinal direction of the vehicle body, thereby transferring the flexible top rearwards or forwards and opening or closing the roof opening of the roof of the vehicle body. More specifically, the roof opening is full closed by bringing the front end of the flexible top into abutment with the front header of the roof opening, thereby extending the flexible top to its maximum extent and covering the roof opening thereof to a full closed extent with the flexible top. When the front end of the flexible top is transferred backwards toward the rear header of the roof opening, the forward end portion of the flexible top is folded in order from its front end thereof. When the flexible top has been folded or wound up to a position in the vicinity of the rear header, the roof opening is almost opened.

Japanese Patent Unexamined Publication (kokai) No. 37,531/1986 discloses such a canvas top vehicle as having the construction as generally described hereinabove, which is further designed such that the flexible top in a folded state is extended forwards from its front end to its maximum extended length by manual operation. This technology improves appearance and sealing performance between the roof and the flexible top due to tension applied to the flexible top in a closed state in the longitudinal direction of the vehicle body. Likewise, U.K. patent specification No. 1,011,473 discloses technology which involves tilting a front end of the canvas top upwards when the canvas top is opened from the state in which the roof opening is full closed or tilting the front end of the canvas top downwards when the canvas top is full closed. This technology relates to tilting the front end of the canvas top downwards and forcing the front end thereof to be engaged with a sealing member disposed on the front header of the roof opening, thereby ensuring sealing performance between the front end of the canvas top and the front header thereof. On the other hand, when the front end of the canvas top is tilted upwards from the state in which the canvas top fully closes the roof opening and as a consequence the front end thereof is disengaged from the sealing member, the forward end portion of the canvas top can smoothly be transferred backwards. The technology of tilting the front end of the canvas top upwards or downwards, as disclosed in this U.K. patent specification, is based on manual operation.

For such a canvas top vehicle, when the canvas top is folded to open its roof opening, it is accommodated at a position rearward of the roof opening, so that the passengers on its rear seats may not sufficiently enjoy open feeling due to its folded canvas top. When the canvas top is partially folded and the roof opening is partially opened, only the forward portion of the roof opening is opened while the rearward portion thereof is covered with the canvas top, so that a large amount of air flown from the open forward portion of the roof opening into the vehicle chamber cannot smoothly be thrown away. This presents the problem of ventilation and the vehicle chamber itself functions as a resonance chamber, thereby generating a noise, i.e., a so-called throbbing sound.

U.S. Pat. No. 2,103,372 discloses another type of canvas top car, which is so designed as to allow its canvas top to be opened or closed from or to both end portions in the longitudinal direction of the vehicle body. More specifically, both of a forward end portion and a rearward end portion of the canvas top can be opened, thereby opening both the forward portion and the rearward portion of the roof opening of the roof. For the canvas top vehicle of this type, the canvas top in a folded state is disposed in a central position in the longitudinal direction of the vehicle body. This type of the canvas top vehicle has the advantage that the passengers seated on the rear seats can enjoy open feeling over their heads as well as those seated on front seats.

For such a canvas top vehicle of the type capable of opening its canvas top from both of the front and rear ends, the forward portion of the roof opening can be opened by transferring the forward end portion of the canvas top rearwards. Likewise, the rearward portion of the roof opening can be opened by transferring the rearward end portion of the canvas top forwards. For this type of the canvas top vehicle, when the forward end portion of the canvas top is transferred rearwards and the rearward end portion thereof is transferred forwards and when the canvas top is placed in a folded state in a middle position of the roof opening, both the forward and rearward portions of the roof opening can be opened at the same time, thereby ensuring a sufficient degree of the ventilation effect or enabling a prevention of the so-called throbbing sound.

It is to be noted herein that the passengers seated on the rear seats and on the front seats can select open feeling if the canvas top could be transferred forwards and/or rearwards while it maintains its folded state when it is located in the middle position of the roof opening. Specifically, the passengers seated on the front seats can enjoy open feeling when the canvas top located in a folded state in the middle position of the roof opening is transferred rearwards. On the other hand, the passengers seated on the front seats can enjoy open feeling if the canvas top is transferred forwards in its folded state when it is located in the middle position thereof.

SUMMARY OF THE INVENTION

Therefore, the present invention has the object to provide a flexible top vehicle with its flexible top so disposed as to open or close both of or either one of its forward end portion and/or its rearward end portion, in which the flexible top can be transferred forwards and/or backwards while it is folded and located in a middle position of the roof opening in a folded state.

The present invention has as another object the provision of a flexible top vehicle with its flexible top so disposed as to open or close either of both of its forward and rearward end portions, in which the flexible top can be transferred forward and/or backward in a folded state when it is located in the middle position of the roof opening.

In order to achieve this object, this invention is a flexible top vehicle having a roof with a roof opening formed thereon and surrounded by a front header, a rear header, and roof side rails. The flexible top is made of a flexible material and is disposed at the roof opening as to assume either a full closed state in which the roof opening is fully covered with the flexible top by extending the flexible top to its full extended length in a longitudinal direction of a vehicle body or an open state in which either a forward portion or a rearward portion of the roof opening, or both, are opened by folding either or both the forward and rearward end portions of the flexible top in a direction longitudinal to the vehicle body.

The roof structure has a first electrically driven motor which is associated with a forward end portion of the flexible top for transferring the forward end portion of said flexible top forward or rearward, and a second electrically driven motor which is associated with a rearward end portion of the flexible top for transferring the rearward end portion of the flexible top forward or rearward. The first and second motor can be turned on and off by a first switch disposed within the vehicle for transferring the flexible top forward by manual operation and a second switch disposed within the vehicle for transferring said flexible top rearward by manual operation.

The invention also includes a first control means for controlling the first electrically driven motor and the second electrically driven motor so as to allow said flexible top to assume a folded state identical to the folded state assumed prior to transfer, by transferring forward the flexible top in a folded state from a middle portion of said roof opening when said first switch is manually turned on; and a second control means for controlling the first electrically driven motor and the second electrically driven motor so as to allow said flexible top to assume a folded state identical to the folded state assumed prior to transfer, by transferring rearward the flexible top in a folded state from a middle portion of said roof opening when said second switch is manually turned on.

This arrangement for the construction of the flexible top vehicle according to the present invention, as described hereinabove, enables the extension of the flexible top due to a rise in temperature or for other causes to be absorbed without causing the flexible top to hang loosely, thereby ensuring the maximum extended length of the flexible top, because the distance between the forward and rearward sliding members disposed on the flexible top is preset to be smaller than the distance between the forward and rearward stopper means.

Further, for the flexible top vehicle according to the present invention, a forward locking mechanism disposed at the forward stopper means and a rearward locking mechanism disposed at the rearward stopper means can lock the forward end portion and the rear end portion of the flexible top, respectively, due to the tension acting upon the flexible top when the opposite end portion of the flexible top is operatively closed. More specifically, for instance, when the rearward end portion of the flexible top starts being transferred backwards in order to close the rearward portion of the roof opening of the roof in such a state in which the forward end portion of the flexible top is closed, the tension produced by pulling the rearward end portion of the flexible top rearwards acts upon the forward end portion of the flexible top in such a manner to pull the forward end portion thereof rearwards, too. And this tension serves as engaging the front end of the flexible top with the forward locking mechanism and locking it in association therewith. In other words, when the rear end of the flexible top is transferred backwards in order to close the rearward portion of the roof opening, the forward end of the flexible top is locked to thereby allow the flexible top to be closed to a full extent.

Other objects, features and advantages of the present invention will become apparent in the course of the description of the preferred embodiments, which follows, in conjuction with the accompanying drawings.

DESCRIPTION OF THE PREFERRED EMBODIMENTS

The present invention will be described more in detail in conjunction with the accompanying drawings.

Figure 1:
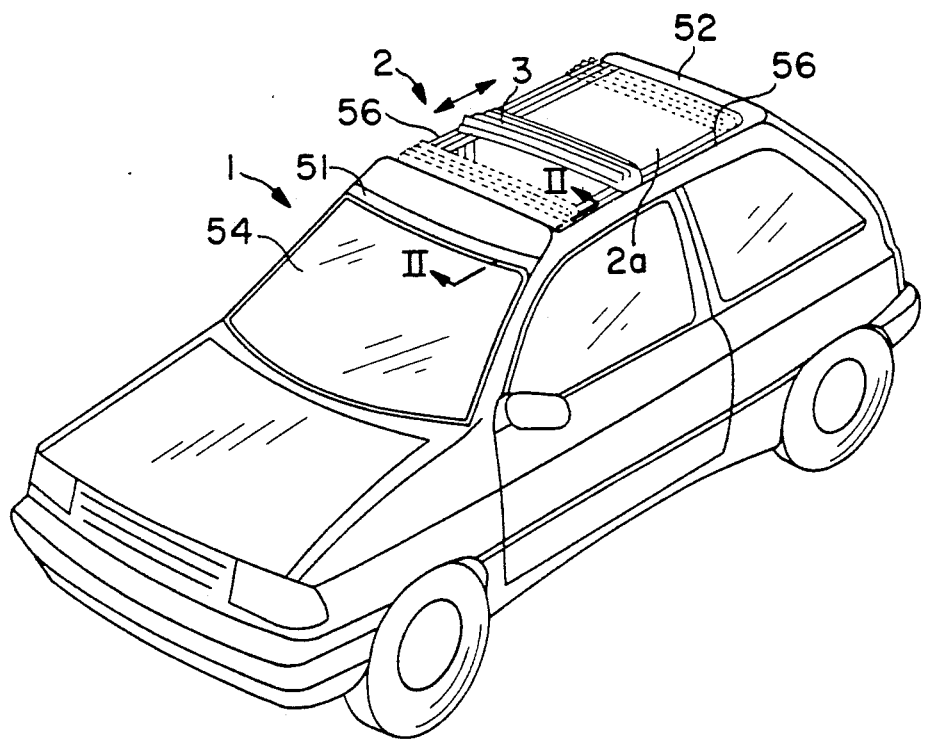
FIG. 1 is a perspective view showing a flexible top vehicle to which the present invention is applied.

As shown in FIG. 1, reference numeral 1 denotes a flexible top vehicle or canvas top vehicle, or a vehicle with a flexible top or canvas top, which is provided on its roof 2 with a roof opening 2a so designed as to be opened or closed by folding or expanding a flexible top 3 made of a flexible member. More specifically, the roof 2 has the roof opening 2a which is defined and surrounded y a front header 51, a rear header 52 and a pair of roof side rails 56, 56. To the roof opening 2a is mounted a frame member 4 corresponding to the front header 51. the rear header 52 and the roof side rails 56, 56, and both longitudinal sides of the frame member comprise guide rails 5, 5, as shown in FIGS. 2 and 3, along which the flexible top 3 is arranged so as to be foldable or expandable in the longitudinal direction of the vehicle body, thereby opening or closing a forward portion of the roof opening 2a of the roof 2 or opening or closing a rearward portion of the roof opening 2a thereof.

Figure 2:
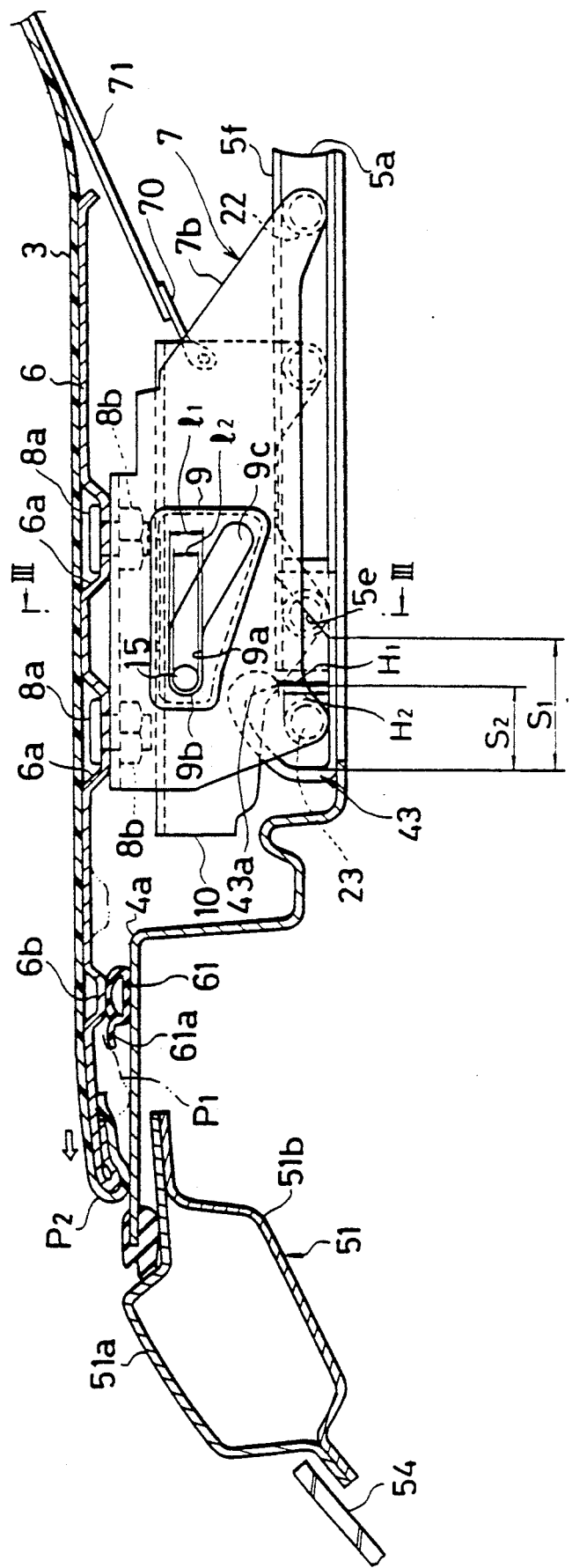
FIG. 2 is a sectional view showing the forward portion of the flexible top vehicle when taken along the line II—II of FIG. 1.
Figure 3:
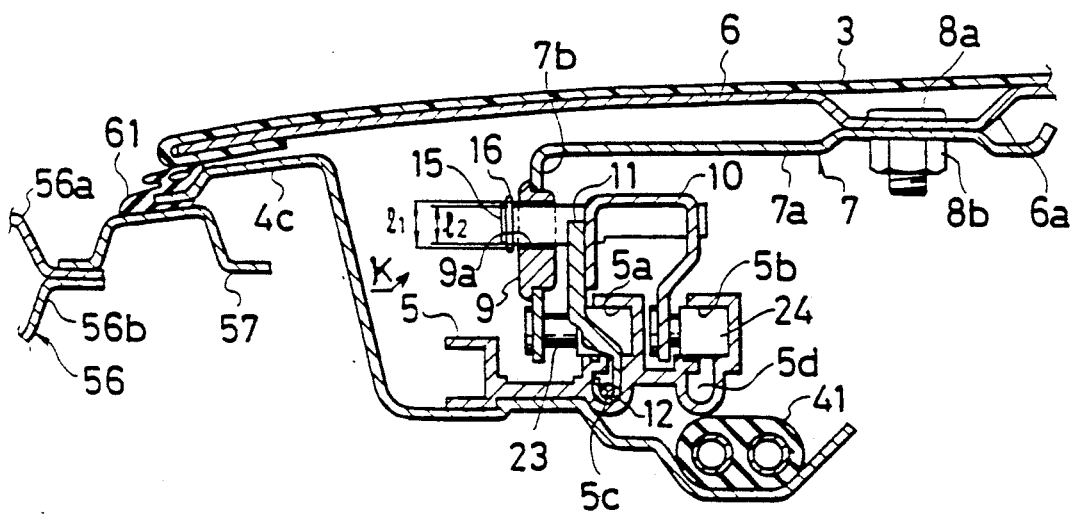
FIG. 3 is a sectional view of the forward portion of the flexible top vehicle, when taken along the line III—III of FIG. 2.

As shown specifically in FIGS. 2 and 3, the flexible top 3 is connected at its forward end portion to a forward plate member 6 made of a hard material, which has mounting sections 6a and 6a on the left-hand and right-hand side portions of the forward plate member 6. To the left-hand and right-hand mounting sections 6a and 6a is mounted and fixed amounting bracket 7 with bolts 8a and 8a and respective nuts 8b and 8b. As shown more specifically in FIG. 3, the mounting bracket 7 comprises a base section 7a and a support section 7b, the base section 7a being secured to the mounting sections 6a and 6a and the support section 7b being so constructed as to extend downwards at its outer edge of the base section 7a. To the support section 7b is secured a cam member 9 having a cam groove 9a which in turn comprises a horizontal groove section 9b extending in an approximately horizontal direction and an inclined groove section 9c being continuously disposed in a position rearward of the horizontal groove section 9b and extending in a diagonally rearward and downward direction of the vehicle body, as shown specifically in FIG. 2.

FIG. 3 further illustrates the mounting bracket 7 which in turn is connected to a slider 10 having a generally inverted U-shaped section through an engaging pin member 15. The cam groove 9a of the cam member 9 is so disposed as to accommodate the engaging pin member 15 so as to be slidable along the cam groove 9a thereof. To an upper portion of the slider 10 is mounted the engaging pin member 15 which in turn is so disposed as to protrude toward the cam groove 9a until an end portion of the engaging pin member 15 passes through the cam groove 9a of the cam member 9. The engaging pin member 15 is provided at its end portion with a snap ring 16 which allows the slider 10 to be connected to the mounting bracket 7. The engagement relationship between the engaging pin member 15 and the cam groove 9a of the cam member 9 constitutes a tilting mechanism K for tilting the forward end portion of the flexible top 3 upwards at an early stage of opening the roof opening 2a and, at the same time, a mechanism for fully closing the forward end portion of the flexible top 3 is a manner as will be described hereinafter. The support section 7b of the mounting bracket 7 has a guide shoe 22 at a lower end portion on its rearward side, and the guide shoe 22 is slidably disposed within an outer guide groove 5a (a second guide rail) of the guide rail 5. On the other hand, the support section 7b of the mounting bracket 7 has another guide shoe 23 at a lower end portion on its forward side, which is so disposed as to be slidably guided upwards and backwards on an inclinded surface 5e of the guide rail 5 and then on an upper surface 5f thereof. By slidably guiding the guide shoe 23 backwards on the upper surface 5f of the guide rail 5 subsequent to passage through the inclinded surface 5e thereof, on the one hand, the forward end portion of the flexible top 3 is displaced or tilted upwards while being transferred backwards. By slidably guiding the guide shoe 23 from the upper surface 5f of the guide rail downwards and forwards to the guide groove 5a through the inclined surface 5e thereof, on the other hand, the flexible top 3 is transferred forwards and the forward end portion of the flexible top 3 is caused to be displaced downwards so as to lie in an aproximately horizontal position, thereby enabling the forward end portion of the flexible top 3 to fully close the forward portion of the roof opening 2a of the roof 2.

As shown in FIG. 2, the guide rail 5 has an inner guide rail section 5b (a first guide rail) which is so disposed as to slidably accommodate a guide shoe 24 which in turn is connected to a lower inner portion of the slider 10. As shown in FIG. 3, to a lower outer portion of the slider 10 is further fixed a guide bracket 11 so as to correspond to the guide rail 5, and the guide bracket 11 is connected at its lower end portion to a forward driving wire 12 disposed and accommodated within an outer groove 5c formed on the outer side of the guide rail 5.

Figure 6:
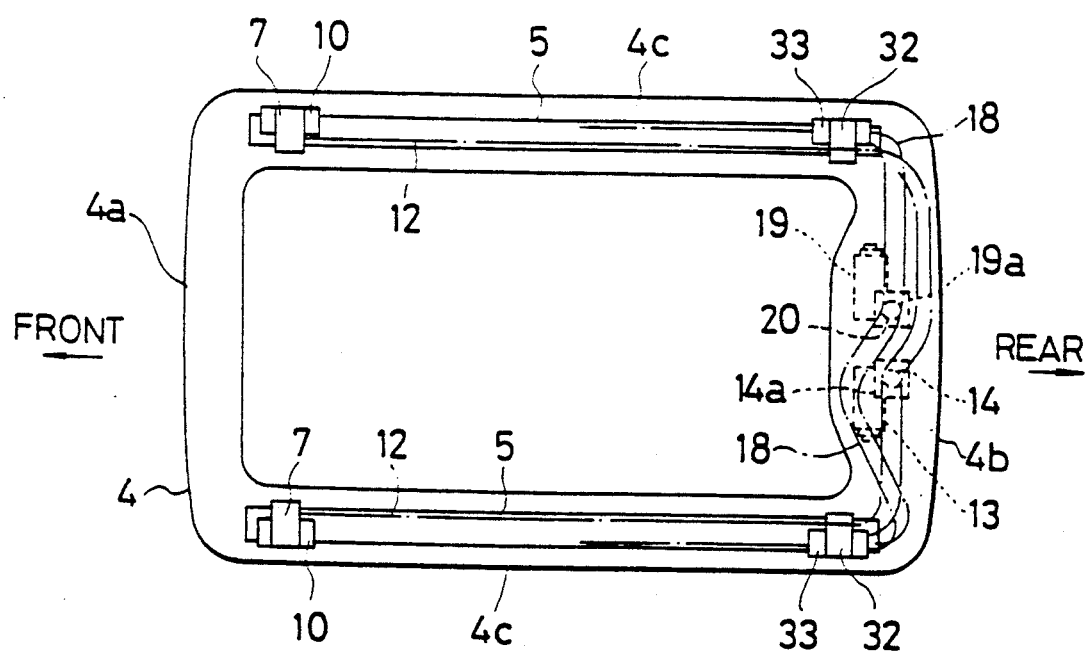
FIG. 6 is a top view showing a frame member to which a driving motor is mounted.
Figure 7:
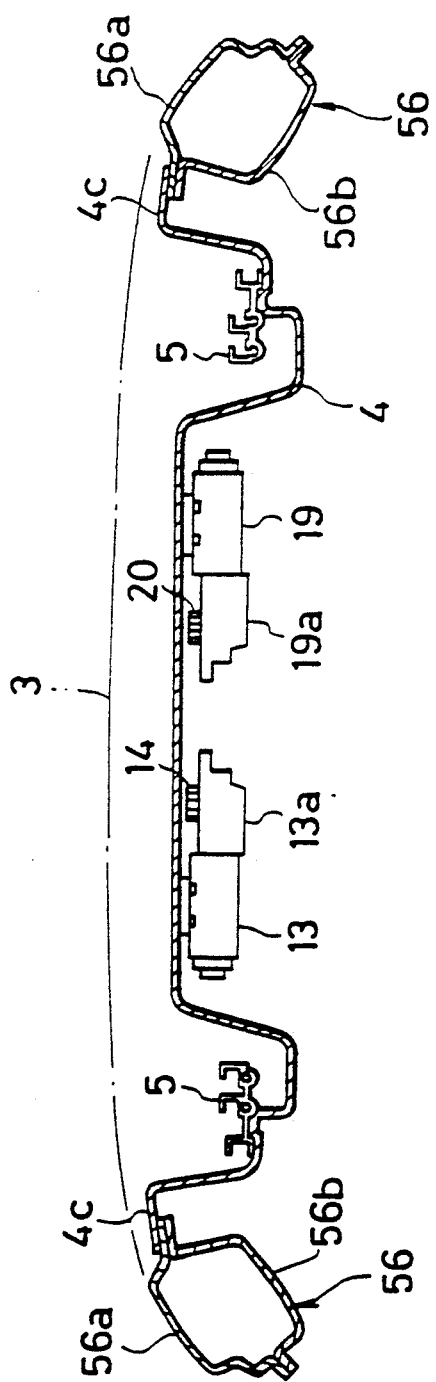
FIG. 7 is a sectional view showing a portion to which the driving motors are mounted.

Referring now to FIGS. 6 and 7, the driving wire 12 is so disposed to be in mesh with a gear 14 which in turn is rotatable by a first driving motor 13 located at an approximately central portion on the left side of a rear side portion 4b of the frame member 4. Further, the driving wire 12 is disposed to extend into a cable accommodation portion 41a formed on the outer side of a forward idle-cable accommodation section 41 on the lower side of the opposite guide rail 5. The forward idle-cable accommodation section 41 is so designed as to accommodate an idle portion of the forward driving wire 12 on the front side of the vehicle body. This arrangement of the forward driving wire 12 allows the flexible top 3 to be opened at its forward end portion by rotation of the first driving motor 13, thereby opening the forward portion of the roof opening 2a of the roof 2.

Description will now be made of the operation of tilting the forward end portion of the flexible top 3 upwards in conjuction with FIG. 2. When the forward portion of the roof opening 2a is opened, the slider 10 is first transferred backwards to thereby allow the engaging pin member 15 to move along the cam groove 9a of the cam member 9 to the right in FIG. 2 and, when the engaging pin member 15 starts transferring downwards along the inclined groove section 9c, a forward end portion of the mounting bracket 7 is caused to arise up or be lifted gradually due to the action of engaging the engaging pin member 15 with the inclined groove section 9c, thereby allowing the forward plate member 6 and eventually the forward end portion of the flexible top 3 to be tilted upwards and, as a consequence, opening the forward portion of the roof opening 2a of the roof 2. The forward plate member 6 is tilted upwards by transferring the guide shoe 23 associated with the front edge of the mounting bracket 7 backwards on the inclined surface 5e of the guide rail 5 and thereafter on the horizontal upper surface 5f thereof. While the guide shoe 23 is being transferred backwards on the upper surface 5e of the guide rail 5, the flexible top 3 is transferred backwards, too, with its forward end portion tilted upwards, thereby folding the forward end portion of the flexible top 3.

Figure 5:
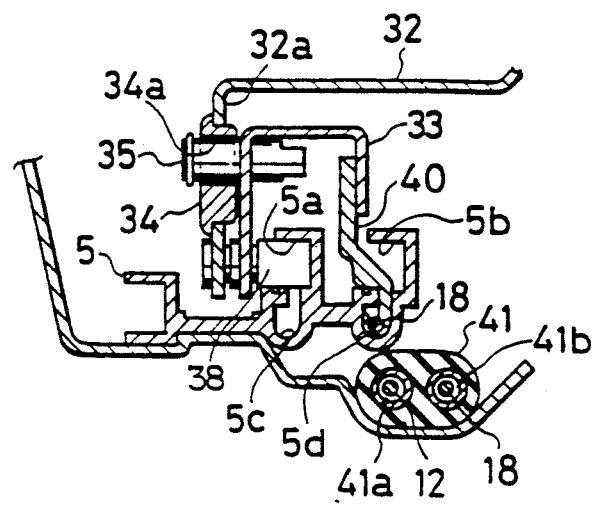
FIG. 5 is a sectional view showing the rearward portion of the flexible top vehicle, when taken along the line V—V of FIG. 4.
Figure 4:
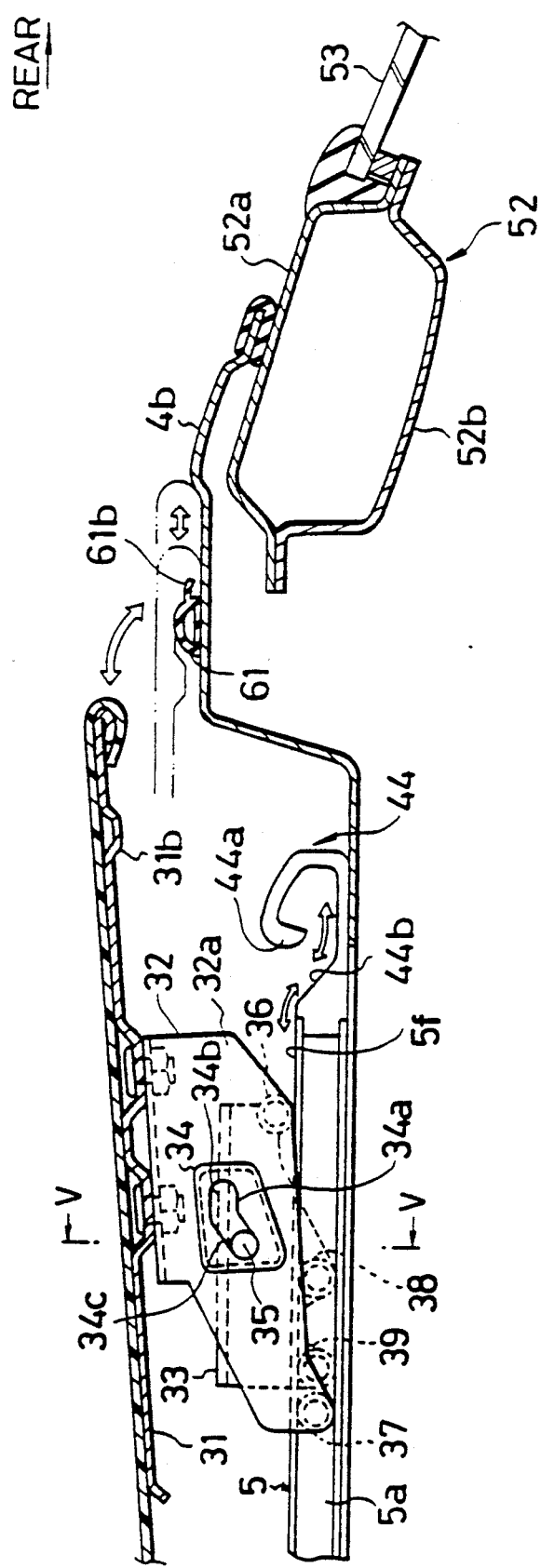
FIG. 4 is a sectional view showing the rearward portion of the flexible top vehicle, similar to that as shown in FIG. 2.

The rearward portion of the flexible top 3 has substantially the same construction as the forward portion thereof as described hereinabove and the rearward end portion of the flexible top 3 is tilted upwards and displaced in a forward direction, thereby opening a rearward end portion of the roof opening 2a. As shown in FIGS. 4 and 5, a rearward plate member 31 is fixed to the rearward end portion of the flexible top 3 to which a mounting bracket 32 in turn is fixed. This connection is made by engaging the engaging pin member 35 secured to the mounting bracket 32 with the cam groove 34a (cam member 34) so disposed as to slidably accommodate the engaging pin member 35. The cam groove 34a of the rearward cam member 34 comprises a horizontal groove section 34a extending in an approximately horizontal direction and an inclined groove section 34c extending in a diagonally forward and downward direction in a manner opposite to the cam groove 9a of the forward cam member 9. To the mounting bracket 32 are mounted a guide shoe 36 and a guide shoe 37, the guide shoe 36 being so mounted as to transfer on an inclined surface 44b of a lock member 44 disposed to be inclined downwards and rearwards and then on the upper surface 5f of the guide rail 5 and the guide shoe 37 being so mounted as to transfer within an outer guide groove 5a formed in the guide rail 5. To the slider 33 are mounted guide shoes 38 and 39 which are so disposed as to be transferred within and along an inner guide groove 5b formed in the guide rail 5.

A rearward driving wire 18 to be connected through a guide bracket 40 to the slider 33 serving as tilting the rearward plate member 31 upwards and opening the rearward end portion of the roof opening 2a is disposed within an inner accommodation groove 5d of the guide rail 5. The rearward driving wire 18 is so disposed as to be in mesh with a gear 20 rotatable by a second driving motor 19 located in an approximately central position of the frame member 4 on the right side thereof and as to extend within a rearward idle-cable accommodation portion 41b formed on an inner side of a cable accommodation member 41 located on a lower side of the opposite guide rail 5. The rearward driving wire 18 is operatively driven by rotation of the second driving motor 19.

Both the first and second driving motors 13 and 19 are disposed in an approximately central position on the left-hand and right-hand rearward portion of the frame member 4 in order to reduce an opening area on the forward side of the roof opening 2a. And both the first and second driving motors 13 and 19 are mounted to a rear surface of the frame member 4, as shown specifically in FIG. 7.

Figure 8:
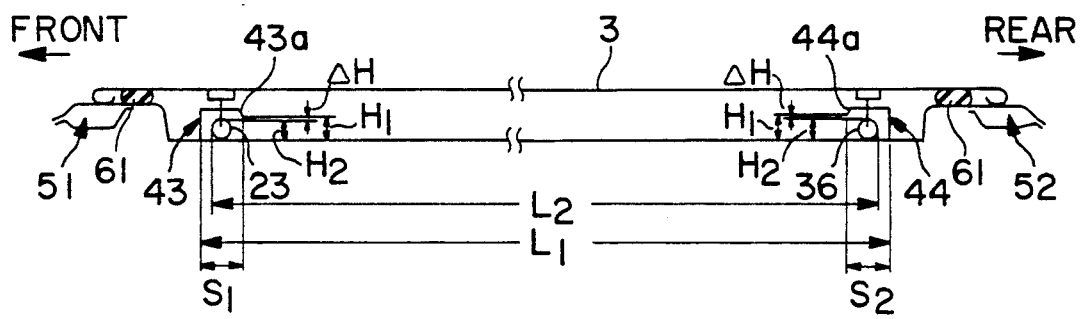
FIG. 8 is a diagrammatic representation of an outline of the mechanical construction of the canvas top.

Both the left-hand and right-hand guide rails 5 and 5 have a forward stopper 43 at each of their front end portions and a rearward stopper 44 at each of their rear end portions. These stopper 43 and 44 are disposed in a predetermined distance in the longitudinal direction of the vehicle body. In other words, the distance between the forward stopper 43 and the rearward stopper 44 is set to be longer than a maximum length of the extended flexible top 3 when it is expanded to its longest possible length in such a state as fully closing the roof opening 2a of the roof 2. Further, as shown specifically in FIG. 8, the distance between the forward and rearward stoppers 43 and 44, as indicated by symbol L1, is set to be longer than a distance between the sliders 23 and 36 when the flexible top 3 is in a state of being full closed. With this arrangement, even if the forward end portion of the flexible top 3 would be closed first or if the rearward end portion thereof would be closed first, the flexible top 3 in a state of fully closing the roof opening 2a is so constructed as to be expanded to its maximum extended length. In other words, the difference between the distances L1 and L2 (L1 > L2) is preset to serve as a margin and the margin is so arranged as to absorb an extension of the flexible top 3 to be caused by a rise of the ambient temperature or by other causes.

Further, as shown in FIG. 2, the forward stopper 43 has a forward claw section 43a extending downwards so as to become engaged with and lock the forward end portion of the flexible top 3, thereby functioning as a forward lock mechanism, while the rearward stopper 44 has a rearward claw section 44a extending downwards so as to become engaged with and lock the rearward end portion of the flexible top 3, thereby functioning as a rearward lock mechanism. For example, as shown in FIG. 2, the claw section 43a is so disposed as to be located in a distance by S2 away from an inner edge of the forward stopper 43, and this distance S2 is set to be shorter than a diameter H2 of the slider 23. Likewise, the claw section 44a is disposed by S1 away from an inner edge of the rearward stopper 44. More specifically, the guide shoe 23 located at the forward end portion of the flexible top 3 is engaged with the forward claw section 43a, thereby locking the forward end portion of the flexible top 3, while the guide shoe 36 located at the rearward end portion of the flexible top 3 is engaged with the rearward claw section 44a, thereby locking the rearward end portion of the flexible top 3. Both the forward claw section 43a and the rearward claw section 44a are so designed as to lock either of the guide shoe 23 or 36 whichever abutted with either of the groove section 43a or 44a first. More specifically, for instance, when the forward end portion of the flexible top 3 is closed first and the guide shoe 23 is brought into abutment with the forward stopper 43, the tension acts rearwards upon the forward end portion of the flexible top 3 when the rearward end portion of the flexible top 3 is closed later. This tension acts upwards upon the engaging pin member 15 due to the tension of the flexible top 3, so that the forward plate member 6 and, eventually, the forward end portion of the flexible top 3 is allowed to pivot upwards about the engaging pin member 15, thereby engaging the guide shoe 23 with the forward claw section 43a of the forward stopper 43 and locking the guide shoe 23.

It is to be noted herein that the horizontal groove section 9b of the cam groove 9a is so disposed as to have a height dimension 1 which is somewhat greater than a diametrical dimension 2, as shown in FIGS. 2 and 3. In other words, there is provided a clearance between the engaging pin member 15 and the horizontal groove section 9b. Further, a height H1 of an edge of the forward claw section 43a from an upper and inner surface of the forward stopper 43, i.e., an height H1 of an opening of the forward claw section 43a, is set to be somewhat larger than a diametrical dimension H2 of the guide shoe 23. Hence, the difference $\Delta h$ ($\Delta h = H1 - H2$) is set to be smaller than the difference $\Delta l$ ($\Delta l = l1 + l2$). With this arrangement, as the rearward end portion of the flexible top 3 is closed, the forward end portion thereof is allowed to be displaced upwards to some extent by the difference $\Delta l$, thereby enabling the guide shoe 23 to be engaged with the forward claw section 43a of the forward stopper 43. The engagement of the guide shoe 23 with the forward claw section 43a can prevent the forward end portion of the flexible top 3 from opening due to the tension acting rearwards upon the flexible top 3 in association with the operation of closing the rearward end portion of the flexible top 3, when the forward end portion thereof is closed first and the rearward end portion thereof is closed thereafter. On the contrary, when the forward end portion of the flexible top 3 is opened, a driving force is produced by the driving cable 12 and acts downward of the engaging pin member 15 so that the guide shoe 23 is caused to be displaced downwards from the forward claw section 43*a* of the forward stopper 43, thereby disengaging the guide shoe 23 from the forward claw section 43*a*. Therefore, as shown in FIG. 2, the guide shoe 23 is allowed to be released from the forward stopper 43 and then to be transferred in a rearward direction. The backward transfer of the guide shoe 23 enables a smoothly backward transfer of the forward end portion of the flexible top 3, thereby opening the forward end portion of the roof opening 2*a*.

It is to be noted herein that no diagrammatic illustration is made in the accompanying drawings on a specific construction between the forward plate member 6 and the rearward plate member 31 yet it is to be understood that a folding mechanism as shown and described in U.S. Pat. No. 2,103,372 may be disposed therebetween so as to fold or extend an intermediate portion of the flexible top 3. Specifically, the flexible top 3 have a plurality, for example, five of skeleton members extending in the transverse direction of the vehicle body, which in turn are disposed in longitudinally spaced relationship. For example, the skeleton members are so disposed as to allow the even-numbered ones from the forward end of the flexible top 3 to the rearward end thereof fixed to the slider 10 to be guided by the guide rails 5 and 5 and to allow the odd-numbered one to be displaced upwards upon folding the flexible top 3. The upward displacement of the skeleton members may be carried out by means of a biasing force of a plate spring 71 of FIG. 2. The plate spring 71 is fixed at its rearward end (on the right-hand side of FIG. 2) to the first skeleton member and at its forward end through the slider 10 to the bracket 70.

As shown in FIG. 2, a forward portion 4*a* of the frame member 4 is mounted to the front header 51 of a closed-sectional structure comprising an upper panel section 51*a* and a lower panel section 51*b*. The forward portion 4*a* of the frame member 4 is so disposed as to extend rearwards from the front header 51 and to be covered with the forward end portion of the flexible top 3, or the forward plate member 6. A sealing member 61 having a lip section 61*a* is disposed on the forward portion 4*a* of the frame member 4 and it is so designed as to allow the sealing member 61 and the lip section 61*a* thereof to become in tight abutment with the lower surface of a protrusion section 6*b* of the forward plate member 6 to thereby tightly closing the forward end portion of the flexible top 3 and, as a consequence, ensuring full sealing performance. In FIG. 2, reference numeral 54 denotes a front window glass panel.

As shown in FIG. 4, a rearward portion 4*b* of the frame member 4 has substantially the same construction and it is operated in substantially the same manner as the forward portion 4*a* of the frame member 4. The rearward portion 4*b* thereof is mounted to the rear header 52 of a closed cross-sectional structure comprising an upper panel 52*a* and a lower panel 52*b*. Likewise, a sealing member 61 having a lip section 61*b* and being continuously connected to the sealing member 61 disposed on the forward portion of the frame member 4 so as to surround the roof opening 2*a* of the roof 2 is mounted on the rearward portion of the frame member 4, thereby allowing a protrusion portion 31*b* of the rearward plate member 31 to become abutted with an upper surface of the sealing member 61 and the rearward end portion of the rearward plate member 31 to become engaged with the lip section 61*b* of the sealing member 61, when the rearward end portion of the flexible top 3 is fully closed, thereby ensuring sealing performance between the rearward plate member 31 and the sealing member 61. In FIG. 4, reference numeral 53 denotes a rear window glass panel.

Referring now to FIG. 3, each side portion 4*c* of the frame member 4 is connected to an extension member 57 fixed to the outer roof rail 56*a* of a roof rail 56 of a closed cross-sectional structure comprising the outer roof rail 56*a* and an inner roof rail 56*b*.

For instance, when the forward portion of the roof opening 2*a* is opened by opening the front portion of the flexible top 3, a switch for opening or closing the forward portion of the flexible top 3 is shifted to an opening state for opening the front portion of the flexible top 3, thereby driving the first driving motor 13 and, as a consequence, tilting the front portion of the flexible top 3 upwards while transferring it in a rearward direction of the body. The switch actually comprises a group of switches, however, description is made herein of FIG. 9 by taking a single switch as an example. More specifically, the first driving motor 13 is driven to operate the driving wire 12, thereby transferring the slider 10 backwards to a small extent and allowing the engaging pin member 15 to transfer the horizontal groove section 9*b* of the cam groove 9*a* of the cam member 9 to the inclined groove section 9*c*. As the engaging pin member 15 is suppressed from deviating in a vertical direction thereof, the front side portion of the mounting bracket 7 is displaced upwards. In other words, the guide shoe 22 located on the rearward side of the mounting bracket 7 is located within the guide groove 5*a* of the guide rail 5, while the guide shoe 23 located on the forward side of the mounting bracket 7 is caused to transfer onto the upper surface 5*f* of the guide rail 5 from the inclined surface 5*e* thereof, thereby tilting the forward plate member 6 upwards and consequently raising the forward end portion of the flexible top 3 up to a position higher than the roof 2, because the mounting bracket 7 is fixed to the forward plate member 6 through the mounting sections 6*a* and 6*b*.

After the forward plate member 6 has been tilted upwards, the switch for opening the forward end portion of the flexible top 3 is kept on being in an opening state to further drive the driving motor 13. Thus, the forward plate member 6 is transferred backwards in such a state in which it has been tilted upwards, while folding the forward portion of the flexible top 3 together with the slider 10, thereby opening the forward end portion of the roof opening 2*a* of the roof 2. Then, when the forward end portion of the roof opening 2*a* is full open, the operation of the driving motor 13 is suspended. The operation of opening the forward end portion of the flexible top 3, namely, the operation of opening the forward end portion of the roof opening 2*a*, may assume two modes by changing the switches. In other words, the first mode is to carry out the operation of opening the flexible top 3 while the operator is kept on depressing the switch. The second mode is to carry out the operation of opening the front end of the flexible top 3 in the rearward direction to a full extent and opening the forward portion of the roof opening 2a to its full open state when the switch is operated once (by full open operation by one touch). It is noted herein that the state in which the forward end of the flexible top 3 is transferred backwards to its full rear end can be detected by a limit switch LSW1. While the limit switch LSW1 is turned on, the operation of the first driving motor 13 is suspended.

When the flexible top 3 is closed, the switch is shifted to a closing state to drive the first driving motor 13, thereby allowing the front end portion of the flexible top 3 to transfer in a forward direction in such a state that the engaging pin member 15 is located at a front end of the horizontal groove section 9b of the flexible top 3. Then, when the forward end portion of the flexible top 3 approaches a position in the vicinity of the forward end of the roof opening 2a of the roof 2, the switch is shifted again to a closing state and the first driving motor 13 is driven, thereby transferring the guide shoe 23 downwards from the upper surface 5f of the guide rail 5 through the inclined surface 5e thereof to a state in which the forward end portion of the flexible top 3 is tilted downwards to an approximately horizontal position. This operation causes the guide shoe 23 to become equal in height to the guide shoe 22, thereby releasing the tilted-up state of the flexible top 3. When the flexible top 3 has been tilted downwards, the front edge of the flexible top 3 is located in a position forward of the sealing member 61 disposed to some extent on the forward portion of the frame member 4, as shown by the dotted line indicated by reference symbol P1 in FIG. 2. In other words, the forward end portion of the flexible top 3 at the position P1 is caused to be tightly abutted with the sealing member 61, thereby ensuring high sealing performance and providing a full closed state for the roof opening 2a of the roof 2 and the flexible top 3. Thereafter, the forward end portion of the flexible top 3 is caused to be transferred forwards to a little extent until it lies in a position as indicated by reference symbol P2 in FIG. 2, while maintaining the state in which the forward end portion of the flexible top 3 is fully closed, thereby fully closing the roof opening 2a of the roof 2. When this is described from the side of the guide rail 5, the distance S1 as indicated in FIG. 2 corresponds to the distance between the start point P1 at which the forward end portion of the flexible top 3 starts closing the forward portion of the roof opening 2a and the end point P2 at which the former has fully closed the latter.

On the other hand, when the rearward end portion of the flexible top 3 is opened or closed in substantially the same manner as the forward end portion thereof as described in detail hereinabove by operation of another switch (not shown) for opening or closing the rearward end portion of the flexible top 3. It is to be noted that the switch for opening or closing the rearward portion of the flexible top 3 is not provided with a full-opening function by one touch, unlike the switch for opening or closing the forward end portion thereof.

When the switch is shifted to an opening state, the second driving motor 19 is driven to thereby tilt upwards and fold the rearward end portion of the flexible top 3 in substantially the same manner as described hereinabove on the forward end portion thereof, because the rearward plate member 31 located at the rearward end portion of the flexible top 3 advances together with the rearward end portion of thereof due to a forward movement of the sliders 33 and 33. The folding of the rearward end portion of the flexible top 3 opens the rearward end portion of the roof opening 2a of the roof 2, thereby providing passengers seated on a rear seat with a wider upward view and open feeling.

As described hereinabove, the first driving motor 13 operatively drives the driving wire 12 independently and separately from the other driving wire 18 to be so disposed as to be operatively driven by the second driving motor, thereby transferring the left-hand and right-hand sliders 10 and 10 and as a consequence the forward end portion of the flexible top 3. On the other hand, the second driving motor 19 operatively drives the driving wire 18 to thereby transfer the left-hand and right-hand sliders 33 and 33 and consequently the rearward end portion of the flexible top 3 in such a manner as independently and separately from the forward end portion thereof. As a result, an open area of the roof opening 2a on both of the forward side and the rearward side can be adjusted as desired. For example, when the rearward portion of the roof opening 2a is opened while the forward portion thereof is opened to a predetermined extent, a flow of air within the vehicle chamber in the forward and rearward directions is improved, thereby avoiding the staying of air within the vehicle chamber. Hence, the ventilation effect can be bettered and the vehicle chamber oscillates thereby working as a resonance chamber, thereby preventing a so-called throbbing sound.

The following is description of the operation when both of the forward end portion and the rearward end portion of the flexible top 3 are in an opened state. In this instance, when the forward end portion of the flexible top 3 is closed first, it is transferred forwards until the guide shoe 23 of the forward end portion of the flexible top 3 is brought into abutment with the forward stopper 43 in the manner as described hereinabove, thereby closing the forward end portion of the roof opening 2a of the roof 2 prior to the rearward end portion thereof.

Thereafter, in order to close the rearward end portion of the roof opening 2a of the roof 2, the rearward end portion of the flexible top 3 is transferred backwards until the rear edge of the flexible top 3 comes into abutment with the rearward stopper 61. The backward transfer of the rearward end portion of the flexible top 3 creates the tension of pulling the forward end portion of the flexible top 3 toward the rear of the vehicle body, and this tension acts upwards upon the engaging pin member 15, thereby consequently pivoting the forward end portion of the flexible top 3 (the forward plate member 6) upwards about the engaging pin member 15. As a result, the guide shoe 23 located at the forward end portion of the flexible top 3 is allowed to be engaged with the claw portion 43a of the forward stopper 43, thereby preventing the forward end portion of the flexible top 3 from being pulled backwards and the forward portion of the roof opening 2a from being opened again. On the other hand, the rearward end portion of the flexible top 3 is brought into such a state of closing the rearward portion of the roof opening 2a. In this instance, in order to regulate farther forward and rearward transfer of the forward end portion and the rearward end portion of the flexible top 3, respectively, the longitudinal distance between the forward stopper 43 and the rearward stopper 44 is set to be longer than a maximum length (L1 > L2) of the flexible top 3 when the flexible top 3 is extended to the longest possible extent that closes the roof opening 2a of the roof 2. It is to be noted herein that the length L2 indicative of the maximum extended length of the flexible top 3, as referred to immediately hereinabove, is set as a value that is longer than (L1−S1−S2).

When the forward end portion of the flexible top 3 in a locked state is opened, the driving force to be applied by the driving cable 12 is caused to act upon the engaging pin member 15 downwards, thereby allowing the guide shoe 23 locked with the claw portion 43a of the forward stopper 43 to be released from its locked state by disengaging the guide shoe 23 from the claw portion 43a thereof and consequently the forward end portion of the flexible top 3 to be smoothly transferred backwards to open the forward portion of the roof opening 2a of the roof 2.

When the rearward end portion of the flexible top 3 in a locked state is opened to close the rearward end portion of the roof opening 2a of the roof 2 first, the operation may be carried out in the manner as described hereinabove.

Figure 9:
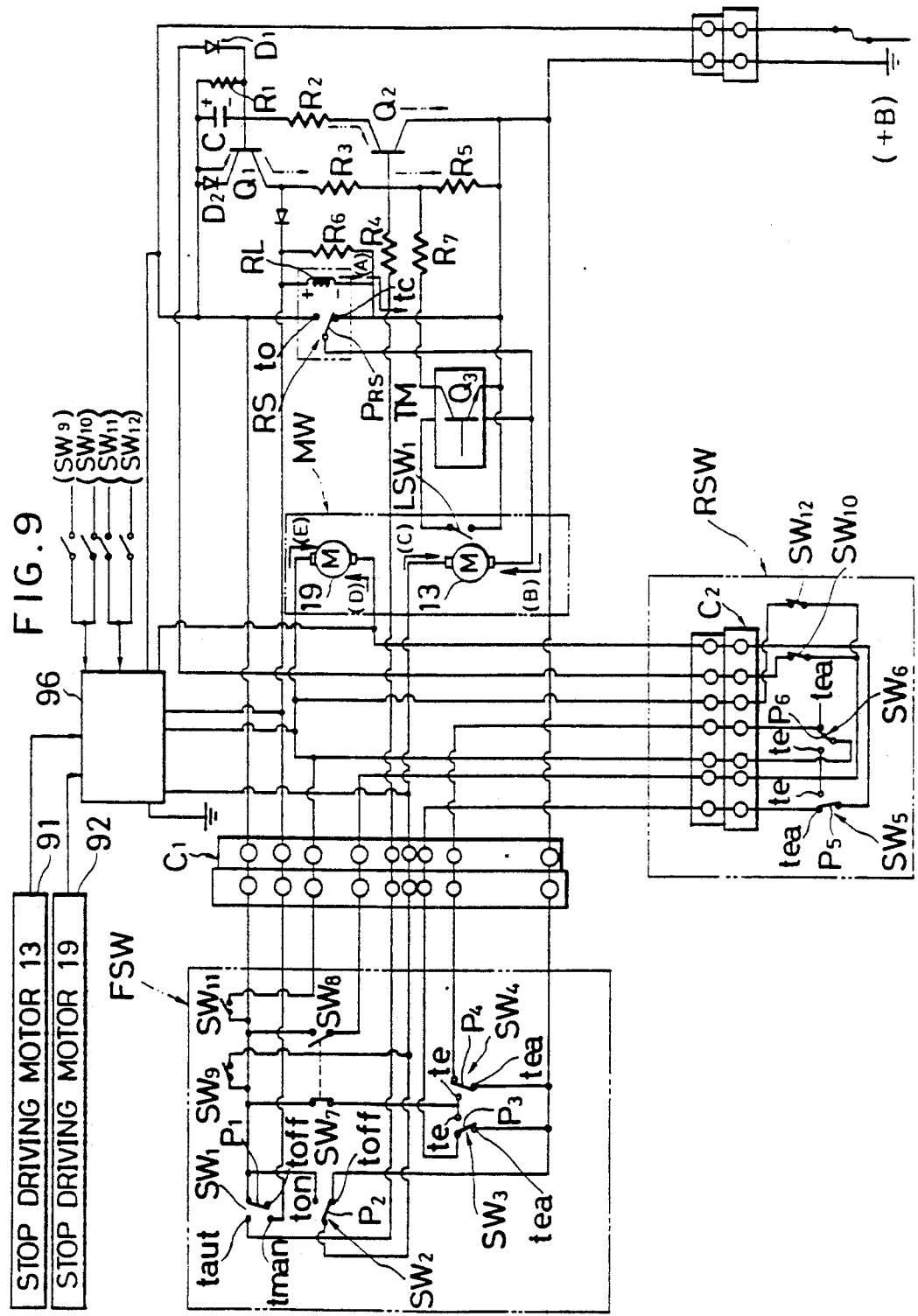
FIG. 9 is a diagrammatic representation of a circuit for a control unit for opening or closing the flexible top.

The vehicle with the flexible top structure or canvas top structure is described hereinabove by way of the preferred embodiments according to the present invention and it may be provided with an electrically opening or closing control device, for example, as shown in FIG. 9, in order to implement opening and closing control as described hereinabove.

The electrically opening or closing control device may roughly comprise an operation switching section FSW for operating the flexible top 3 on the front seat side (driver's seat side) of the vehicle, an operation switching section RSW for operating the flexible top 3 on the rear seat side thereof, a motor unit MW having a first driving motor 13 and a second driving motor 19 to be rotatably drivable in an arbitrary direction of closing or opening by the operation switching sections FSW and RSW, and a timer circuit unit TM for controlling an operational state of the first driving motor 13 by means of a timer, and these components are connected to each other through connector sections C1 and C2, respectively.

The operation switching section FSW disposed on the front seat side for operating the flexible top 3 may comprise a group of eight switches consisting of an automatically/manually opening switch SW1, a manually closing switch SW2, a manually rearward-portion opening switch SW3, a manually rearward-portion closing switch SW4, an operation shifting switches SW7 and SW8, a forward-moving switch SW9, and a rearward-moving switch SW11.

The automatically/manually opening switch SW1 disposed on the front side for automatically or manually opening a forward end of the flexible top 3 is a switch of a push-pull type having two ON contacts points consisting of a manually driving contact point tman and an automatically driving contact point taut. When the switch SW1 is slightly depressed (by a so-called turning-on-by-one-step-push operation), a movable contact arm P1 on the power source (+B) side is allowed to come into contact with the manually driving contact point tman, thereby driving the first driving motor 13 in the direction of transferring the front end of the flexible top 3 backwards and opening the forward portion of the roof opening 2a. When the switch SW1 is turned off and opened by releasing the depression by the driver and, at this point of time, the operation of the first driving motor 13 is suspended. When the switch SW1 is depressed to a more depth (by a so-called turning-on-by-two-step-push operation), the movable contact arm P1 is allowed to come into contact with the automatically driving contact point taut, thereby operating the first driving motor 13 automatically and continuously up to the point where the forward portion of the roof opening 2a is full open. The operation of the first driving motor 13 is continued for a period of time predetermined by a timer TM in a manner as will be described hereinafter.

More specifically, when the movable contact arm P1 on the power source side of the automatically/manually opening switch SW1 on the front seat side is connected to the manually driving contact point tman by means of the turning-on-by-one-step-push operation, the electric current is applied to a relay coil RL of a relay circuit LC through this contact point tman in the direction as indicated by the arrow A, thereby allowing a movable contact arm PRS of a relay contact point RS corresponding thereto to be shifted from the closed point to side to the open contact point to side. As a result, the electric current is applied to the first driving motor 13 from the power source (+B) side in the direction as indicated by the arrow (B), thereby driving the first driving motor 13 and operating the forward portion of the roof opening 2a. This opening operation is suspended at the point of time when the driver has released its depression onto the switch SW1.

When the movable contact arm P1 of the automatically/manually opening switch SW1 disposed on the front side for operating the flexible top 3 has been shifted to the side of the automatically driving contact point taut by the turning-on-by-two-step-push operation, a predetermined magnitude of voltage is applied from the power source through the automatically driving contact point taut to the base side of a second transistor Q2, thereby turning the second transistor Q2 on, while turning a third transistor Q3 off. As a result, the base voltage of first transistor Q1 is caused to be lowered to thereby turn the first transistor Q1 on and to apply the electric current to the relay coil RL in the direction as indicated by the arrow (A). Consequently, the movable contact arm PRS is shifted to the side of the open contact point to, thereby applying the driving current to the first driving motor 13 in the direction as indicated by the arrow (B) and transferring the front end of the flexible top 3 backwards. This backward transfer of the flexible top 3 is continued until a time set by the timer circuit section TM has been elapsed or until the third transistor Q3 has been turned on after having turned a first limit switch LSW1 on. The ON state given by the turning-on-by-two-step-push operation is released when the forward portion of the roof opening 2a has become full open. In other words, by having the time set by the timer circuit section TM elapsed or by turning the third transistor Q3 of the timer circuit section TM on after having turned the first limit switch LSW1 on, then the second transistor Q2 is caused to be turned off, thereby suspending the first driving motor 13. It is to be noted herein that the third transistor Q3 in the timer circuit section TM is so constructed in advance as to correspond to a time required for fully opening the flexible top 3, even if the first limit switch LSW1 is off. This is to insure safe suspension of the motor under two conditions even in case of accident on the limit switch.

The automatic driving in the manner as described hereinabove allows the flexible top 3 to be transferred to the rearward end side of the roof opening 2a and to be accommodated on the rearward end portion of the roof opening 2a, thereby opening the roof opening 2a to the greatest possible extent.

The manually closing switch SW2 disposed on the front side for manually closing the flexible top 3 is so constructed as to act as a switch for exclusive use with manual operation, which has an ON contact point ton and an OFF contact point toff, thereby permitting the switch SW2 to keep its ON state while it is depressed and to be turned off as the driver has released the depression thereon. A movable contact arm P2 of this manually closing switch SW2 is connected to an electric source terminal on the side of closing the flexible top 3 by rotating the first driving motor 13. Hence, for example, when the movable contact arm P2 has been shifted from the OFF point toff (on the earth side) to the ON point ton (on the power source side), the movable contact arm PRS of the relay contact point RS exists on the side of the closed contact point tc so that the electric current is applied from the power source to the first driving motor 13 in the direction as indicated by the arrow (C), which is opposite to the direction in which the current is applied at the time of driving the first driving motor 13 for opening the flexible top 3, thereby allowing the first driving motor 13 to be rotated in the direction of closing the forward end of the flexible top 3. The operation of closing the forward end portion of the roof opening 2a is suspended as the operator has released the operation of the switch SW2.

The manually rearward-portion opening switch SW3 disposed on the front seat side for manually opening the rearward portion of the roof opening 2a is so operated as to open the rearward end of the flexible top 3. The manually rearward-portion closing switch SW4 disposed on the front seat side for manually closing the rearward portion of the roof opening 2a is so operated as to close the rearward end of the flexible top 3. These switches SW3 and SW4 may be employed in an alternative way in the substantially the same manner as the manually rearward-portion opening switch SW5 and the manually rearward-portion closing switch SW6, each disposed on the rear seat side, as will be described hereinafter. More specifically, the operation shifting switches SW7 and SW8 mounted on the operation switching section FSW disposed on the front seat side are to be associated with each other. In other words, when the switch SW7 is turned on, on the one hand, the switch SW8 is turned off, thereby disconnecting the power source for the switch on the rear seat side. When the switch SW7 is turned off, on the other hand, the switch SW8 is turned on, thereby disconnecting the power source for the switch on the front seat side.

When the power source for the switch disposed on the front seat side is disconnected, on the one hand, this arrangement allows the supply of the electric current to the second driving motor 19 to be kept being disconnected even if the switches SW3 and SW4 would be turned on. When the power source for the switch disposed on the rear seat side, on the other hand, the supply of the electric current to the second driving motor 19 is continuously suspended even if both the switches SW5 and SW6 disposed on the rear side would have been turned on.

Given the foregoing, for example, in a state where the power source for the switch on the rear seat is disconnected by turning the switch SW7 on and the switch SW8 off, as shown in FIG. 9, when the movable contact arm P3 of the switch SW3 is shifted from the position on the side of the contact point tea on the earth side (OFF position) to the position on the side of the contact point te on the power source side (ON position), the electric current is applied from the power source to the second driving motor 19 in the direction as indicated by the arrow D, thereby driving the second driving motor 19 in the direction of opening the rearward end portion of the flexible top 3. The rotation of the second driving motor 19 is continued during the period of time when the manually rearward-portion opening switch SW3 disposed on the front side is operatively turned on and the rotation thereof is suspended when the operation of turning the switch SW3 on is released.

When the movable contact arm P4 of the manually rearward-portion closing switch SW4 on the front side is shifted from the OFF state as shown in FIG. 9 (the position of the contact point tea on the earth side) to the contact point te on the power source side, the electric current is supplied from the power source to the second driving motor 19 in the direction as indicated by the arrow (E) and the second driving motor 19 is thereby rotated in the direction of closing the rearward end of the flexible top 3.

The rotation of the second driving motor 19 is continued during the period of time when the manually rearward-portion closing switch SW4 disposed on the front side is operatively turned on and it is suspended when the operation of turning the switch SW4 on is released. Hence, the second driving motor 19 can be controlled by the operation at the front seat in a desired way, thereby appropriately opening or closing the rearward end of the flexible top 3.

On the side of the operation switching section RSW disposed on the rearward seat side, there are provided four operating switches consisting of the manually rearward-portion opening switch SW5, the manually rearward-portion closing switch SW6, a forward-moving switch SW10, and a rearward-moving switch SW12.

The manually rearward-portion opening switch SW5 disposed on the rear seat side for manually opening the rearward end portion of the flexible top 3 is so devised as to open the rearward end of the flexible top 3. The manually rearward-portion closing switch SW6 disposed on the rear seat side for manually closing the rearward end portion thereof is so devised as to close the rearward end of the flexible top 3.

Given the state in which the shifting switch SW7 is turned off and the shifting switch SW8 is turned on to thereby disconnect the power source to the switch disposed on the front seat side, for example, when the movable contact arm P5 of the manually rearward-portion opening switch SW5 is shifted from the position of the OFF contact point tea on the earth side to the position of the ON contact point te on the power source side as shown in FIG. 9, on the one hand, the electric current is applied from the power source to the second driving motor 19 in the direction as indicated by the arrow (D) and rotating the second driving motor 19 in the direction of opening the rearward end of the flexible top 3. The rotation of the second driving motor 19 is continued during the period of time when the manually rearward-portion opening switch SW5 is kept in an ON state and suspended when the operation for turning the switch SW5 on is released.

Further, for example, when the movable contact arm P6 of the manually rearward-portion closing switch SW6 is shifted from the position of the OFF contact point tea on the earth side to the position of the ON contact point te on the power source side as shown in FIG. 9, on the other hand, the electric current is supplied from the power source to the terminal of the power source on the side of rotating the second driving motor 19 for closing the flexible top 3 in the direction as indicated by the arrow (E), thereby rotating the second driving motor 19 in the direction of closing the rearward end of the flexible top 3. This rotation of the second driving motor 19 is likewise kept on being carried out while the manually rearward- portion closing switch SW6 is turned on and it is suspended at the point of time when the switch SW6 is turned off. This operation allows the switch disposed on the rear seat side to drive the second driving motor 19 for opening or closing the rearward end portion of the flexible top 3.

As have been described hereinabove, the forward-moving switch SW9 and the rearward-moving switch SW11 are disposed on the front seat side while the forward-moving switch SW10 and the rearward-moving switch SW12 are disposed on the rear seat side, thereby allowing the first and second driving motors 13 and 13 to be continuously driven to transfer the flexible top 3 forwards or rearwards to thereby open or close the corresponding portion of the roof opening 2a.

The forward-moving switch SW9 disposed on the front seat side of the vehicle in an ON state is so designed as to operate the first driving motor 13 in the direction of closing the forward portion of the roof opening 2a by moving the forward end of the flexible top 3 forwards. Likewise, the rearward-moving switch SW11 disposed on the front seat side thereof in an ON state is so arranged as to operate the second driving motor 19 in the direction of closing the rearward portion of the roof opening 2a by transferring the rearward end of the flexible top 3 rearwards. These forward-moving switch SW9 and rearward-moving switch SW11 are operated to transfer the flexible top 3 so disposed as to be folded in a generally middle portion of the roof opening 2a in the forward and rearward directions, respectively, while the flexible top 3 is in such a folded state.

Both the forward-moving switch SW10 and the rearward-moving switch SW12 are disposed on the rear seat side of the vehicle so as to be operated in substantially the same manner as both the forward-moving switch SW9 and the rearward-moving switch SW11. And these forward-moving switch SW10 and rearward-moving switch SW12 are operated to transfer the flexible top 3 disposed in a folded form at a generally middle portion of the roof opening 2a in the forward and rearward directions, respectively, while the flexible top 3 is in such a folded state.

As shown in FIG. 9, reference numeral 96 denotes a control unit which in turn comprises, for example, a microcomputer comprised of a central processing unit (CPU), random access memory (RAM), read-only memory (ROM) and so on in per se known manner. The control unit 96 is so designed as to accept inputs of each state of operations of the forward-moving switches SW9 and SW10 and the rearward-moving switches SW11 and SW12 as well as the states of of operations of the first and second driving motors 13 and 19 corresponding to the forward-moving switch SW9 and the rearward-moving switch SW11 as well as to the forward-moving switch SW10 and the rearward-moving switch SW12, respectively. Further, the control unit 96 is so arranged as to store operations of each of the forward-moving switches SW9 and SW10 as well as the rearward-moving switches SW11 and SW12 and to store counts of periods of time for which the first or second driving motors 13 and 19 corresponding thereto are driven. This permits a to-and-fro movement of the flexible top 3 in a folded state.

Brief description will now be made of the control over the operations for turning the switches SW9 to SW12 on.

First, the forward-moving switch SW9 disposed on the front seat side will be made. While the forward-moving switch SW9 is operated in an ON state, the first driving motor 13 is so operated as to transfer the front end of the flexible top 3 forwards, thereby gradually closing the forward portion of the roof opening 2a. On the other hand, when the ON operation of the forward-moving switch SW9 is released, the operation of the first driving motor 13 is suspended leading to suspension of the forward movement of the front end of the flexible top 3. The operation period of time T of the first driving motor 13 is counted by the timer (T) disposed within the control unit 96. The suspension of the operation of the first driving motor 13 is detected by a first suspension detecting means 91 for detecting the suspension of the driving motor 13 and the detection of the suspension thereof triggers the start-up of the operation of the second driving motor 19 transferring the rear end of the flexible top 3 forwards. The period of time during which the second driving motor 19 is to be operated is the same as the operation period of time T for the first driving motor 13. With this arrangement, the operation for turning the forward-moving switch SW9 disposed on the front seat side to an ON state allows the forward end of the flexible top 3 to be transferred forwards, followed by the forward movement of the rear end of the flexible top 3 in the same distance as the forward end thereof, which is accompanied by the operation of the second driving motor 19 triggered by the suspension of the first driving motor 13. As a result, the open area of the forward portion of the roof opening 2a is decreased while the open area of the rearward portion thereof is increased by substantially the same area.

The rearward-moving switch SW11 disposed on the front seat side has substantially the same function and is operated in substantially the same way as the forward-moving switch SW9. Specifically, when the rearward-moving switch SW11 is turned on, the second driving motor 19 is first driven to transfer the rear end of the flexible top 3 backwards. When the operation of the rearward-moving switch SW11 for turning it on is released and the operation of the second driving motor 19 is suspended, this suspension works as a trigger, thereby transferring the front end of the flexible top 3. This operation allows the forward end of the flexible top 3 to be transferred backwards in substantially the same distance as the rearward end thereof has been transferred backwards. Consequently, the open area at the forward portion of the roof opening 2a is widened in the same amount as the open area at the rearward portion thereof is narrowed. The suspension of the operation of the second driving motor 19 is to be detected by a second suspension detecting means 92.

It is now to be noted that the forward-moving switch SW10 disposed on the rear seat side has substantially the same functions as the forward-moving switch SW9 disposed on the front seat side and, at the same time, that the rearward-moving switch SW11 disposed on the rear seat side has likewise substantially the same functions as the rearward-moving switch SW12 disposed on the rear seat side.

Figure 10:
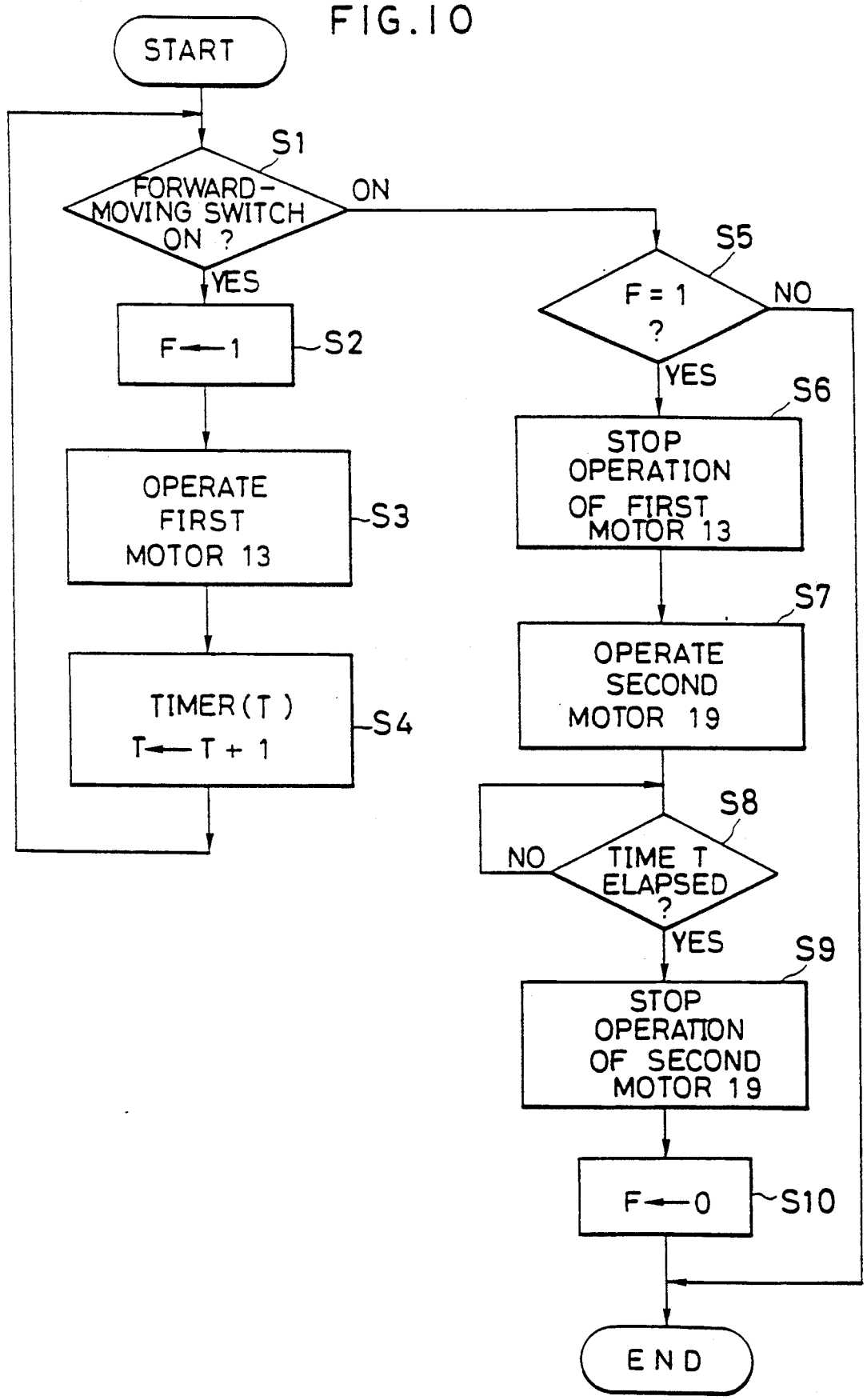
FIGS. 10 and 11 are flowcharts showing an example of control according to the present invention.
Figure 11:
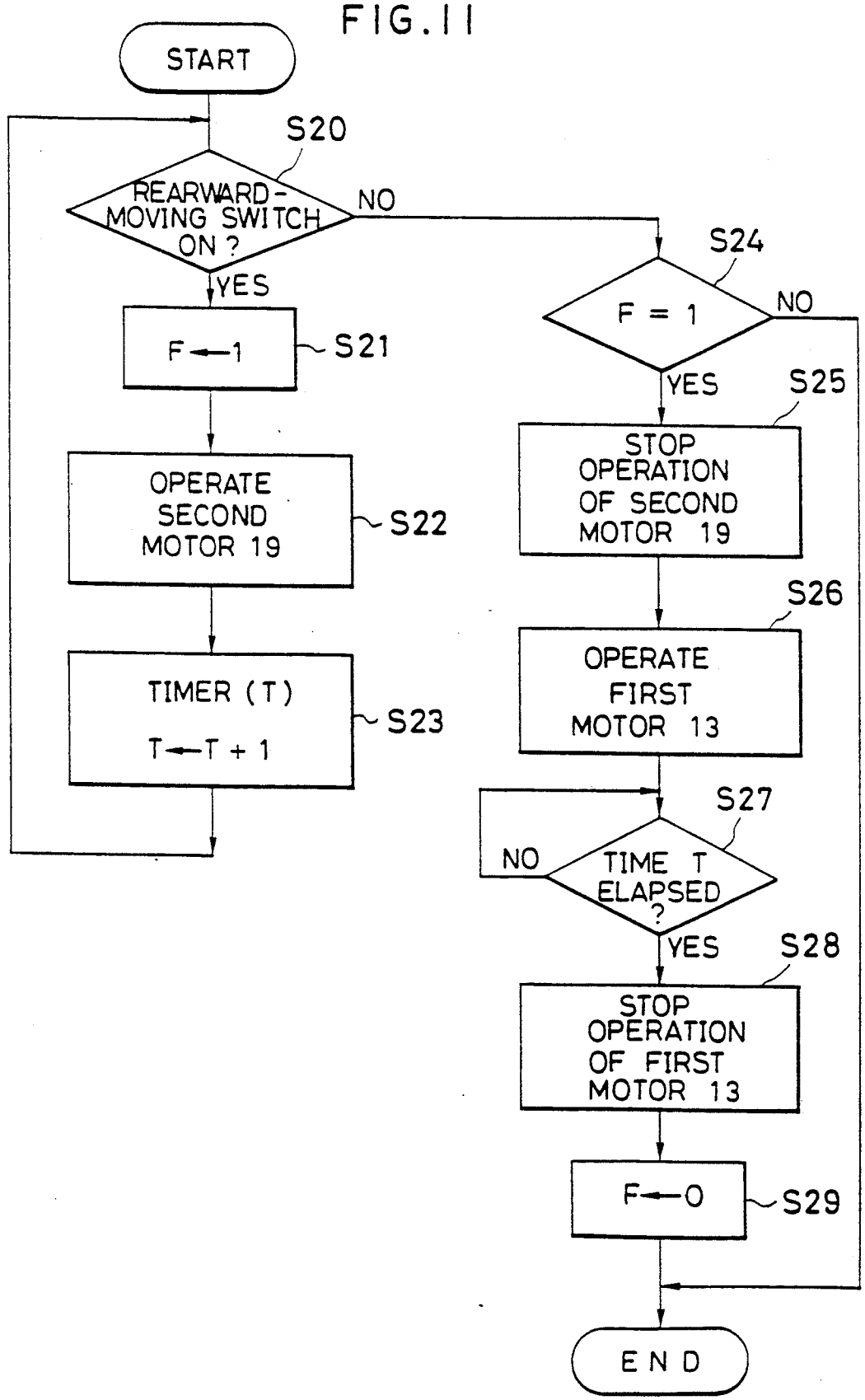

An specific example of controlling the operation of the switches SW9 to SW12, inclusive, for turning them on will be described hereinafter on the basis of flow-charts as shown in FIGS. 10 and 11.

FIG. 10 shows an example of the embodiment for controlling the operations of the forward-moving switch SW9 disposed on the front seat side and the forward-moving switch SW10 disposed on the rear seat side.

First, at step S1, a decision is made to determine if either of the forward-moving switch SW9 or SW10 is turned on. When the result of decision at step S1 indicates that either of the switch SW9 or SW10 is turned on, on the one hand, the program flow goes to step S2 at which flag F is set to one (1), followed by step S3 at which the operation of the first driving motor 13 is started, thereby starting transfer of the front end of the flexible top 3 forwards. At the same time as the start-up of the first driving motor 13, the timer (T) starts counting the operation time of the first driving motor 13 at step S4, followed by returning to step S1.

When the result of decision at step S1 indicates that neither the forward-moving switch SW9 nor the forward-moving switch SW10 are turned on, or when the operation for turning the switch SW9 or SW10 on is released, then the program flow advances to step S5 at which a decision is made to determine whether or not the flag is F=1. When it is decided at step S5 that the flag is F=1, the program flow goes to step S6 at which the operation of the first driving motor 13 is suspended, thereby suspending the forward movement of the front end of the flexible top 13. Then, at step S7, the operation of the second driving motor 19 is started, followed by transferring the rear end of the flexible top 3 forwards. The operation of the second driving motor 19 is continued for the period of time T which has been counted by the timer (T) at step S4, so that it is decided at step S8 to determine if the period of time T has been elapsed. When the result of decision at step S8 indicates that the period of time T has been elapsed, the program flow goes to step S9 at which the operation of the second driving motor 19 has been suspended, followed by the end of the forward movement of the rear end of the flexible top 3 and thereafter by proceeding to step S10 at which the flag F is set to zero (0).

When the result of decision at step S5 indicates that the flag is not F=1, then the program ends.

FIG. 11 shows an example of the embodiment of control over the operations for turning the rearward-moving switch SW11 disposed on the front side and the rearward-moving switch SW12 disposed on the rear seat side to an ON state.

Referring to FIG. 11, at step S20, a decision is first made to determine if either of the rearward-moving switch SW11 or SW12 is turned on. When it is decided at step S20 that either of the rearward-moving switch SW11 or SW12 is turned, then the program flow goes to step S21 at which the flag F is set to one (1), followed by proceeding to step S22 at which the operation of the second driving motor 19 is started up, thereby transferring the rearward end of the flexible top 3 in the rearward direction. Upon the start-up of the operation of the second driving motor 19, the timer (T) starts counting the operation time of the second driving motor 19 at step S23, followed by returning to step S20.

When it is decided at step S20 that neither of the rearward-moving switch SW11 nor the rearward-moving switch SW12 are turned on, the program flow goes to step S24 at which it is confirmed whether the flag is set to F=1. When the result of decision at step S24 indicates that the flag is set to F=1, the program flow goes to step S25 at which the operation of the second driving motor 19 is suspended, thereby suspending the backward transfer of the rearward end end of the flexible top 3. Then, the program flow goes to step S26 at which in turn the operation of the first driving motor 13 is started up, thereby transferring the front end of the flexible top 3 rearwards. Then, at step S27, the operation of the first driving motor 13 has been continued for the period of time T measured and counted by the timer (T) in the same manner as described hereinabove at step S23. After it is decided at step S27 that the predetermined period of time has been elapsed, then the program flow goes to step S28 at which the operation of the first driving motor 13 is suspended to suspend the rearward movement of the flexible top 3, followed by proceeding to step S29 at which it is confirmed that the flag F is set to zero (0).

When the result of decision at step S24 indicates that the flag is set to F=0, then the program flow directly ends.

Figure 12:
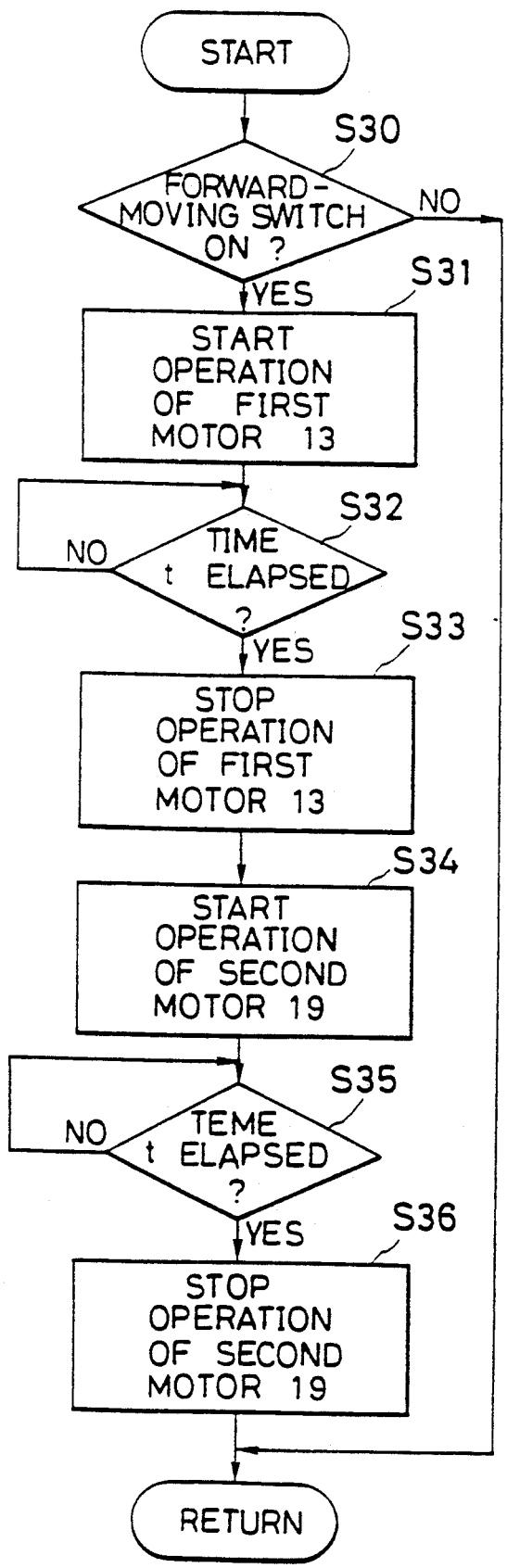
FIGS. 12 and 13 are flowcharts showing variants of control according to the present invention.
Figure 13:
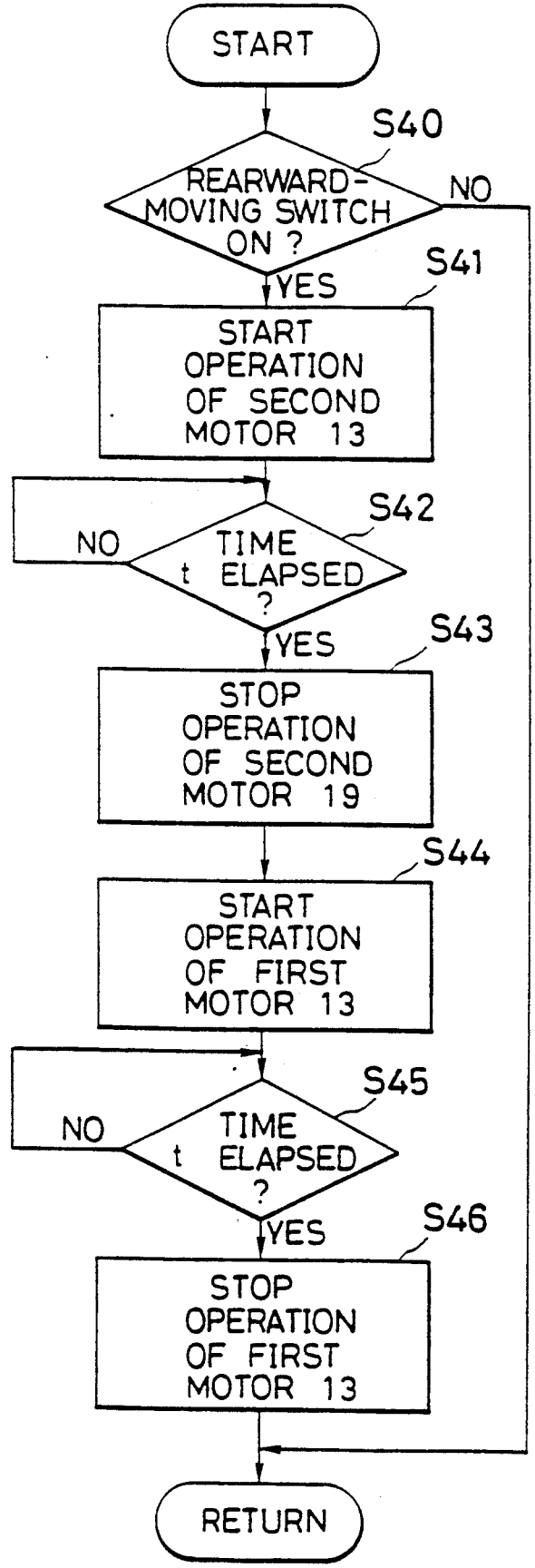

FIGS. 12 and 13 are directed to variants of control in accompany with the operations for turning the switches SW9 to SW12, inclusive, to an ON state.

FIG. 12 relates to the forward-moving switch SW9 disposed on the front seat side and the forward-moving switch SW10 disposed on the rear seat side. First, at step S30, a decision is made to determine whether or not either of the forward-moving switch SW9 or SW10 is turned on. When it is decided at step S30 that either of the switch SW9 or SW10 is turned on, then the program flow goes to step S31 at which the first driving motor 13 starts being operated. The operation of the first driving motor 13 is continued for a predetermined period of time t at step S32. As it is decided at step S32 that the predetermined time t has been elapsed, the operation of the first driving motor 13 is suspended, followed by advancing to step S33 at which the operation of the first driving motor 13 is suspended. The predetermined period of time t may be set to a value as short as, for example, 3 seconds. By operating the first driving motor 13 for the predetermined period of time t—for example, for 3 seconds—the forward end of the flexible top 3 is transferred forwards to a slight extent.

Then, at step S34, the operation of the second driving motor 19 is started and the second driving motor 19 is continuously operated for the same predetermined period of time t. When the result of decision at step S35 indicates that the predetermined period of time t has been elapsed, then the program flow proceeds to step S36 at which the operation of the second driving motor 19 is suspended. The operation of the second driving motor 19 for the predetermined period of time t allows a forward movement of the rearward end of the flexible top 3 in substantially the same distance as the forward movement of the backward end thereof.

The operation and suspension of the first driving motor 13 as well as the operation and suspension of the second driving motor 19 to be conducted thereafter have been continued while the forward-moving switch SW9 or SW10 has been kept being turned on. This arrangement for the operations allows the forward end of the flexible top 3 to be transferred, followed by the transfer of the rear end thereof, and this movement of the flexible top 3 is repeated to allow a forward movement of the flexible top 3.

FIG. 13 is directed to the operation of the rearward-moving switches SW11 and SW12. First, at step S40, a decision is made to determine if either of the rearward-moving switch SW11 or SW12 is turned on. When the result of decision at step S40 indicates that either of the rearward-moving switch SW11 or SW12 is turned on, the program flow goes to step S41 at which the operation of the second driving motor 19 is started. The operation of the second driving motor 19 is continued for the same predetermined period of time t at step S42. When it is decided at step S42 that the predetermined period of time t has been elapsed, then the program flow goes to step S43 at which the operation of the second driving motor 19 is suspended. The predetermined period of time t may be set to a value as short as, for example, 3 seconds, in the same manner as described hereinabove with reference to FIG. 12. Hence, by operating the second driving motor 19 for the predetermined period of time t, the rearward end of the flexible top 3 is moved backwards to a slight extent.

Then, the program flow goes to step S44 at which the first driving motor 13 is started. The operation of the first driving motor 13 has been continued for the same predetermined period of time t as described hereinabove. When it is decided at step S45 that the predetermined period of time t has been elapsed, the program flow goes to step S46 at which the operation of the first driving motor 13 is suspended. Hence, by operating the first driving motor 13 for the predetermined period of time t, the front end of the flexible top 3 is transferred backwards in the same distance as the rear end thereof.

The operation and suspension of the second driving motor 19 as well as the operation and suspension of the second driving motor 13 to be conducted thereafter have been continued while the rearward-moving switch SW11 or SW12 has been kept being turned on. This arrangement for the operations allows the rear end of the flexible top 3 to be transferred rearwards, followed by the rearward transfer of the front end thereof, and this movement of the flexible top 3 is repeated to allow a rearward movement of the flexible top 3.

Figure 14:
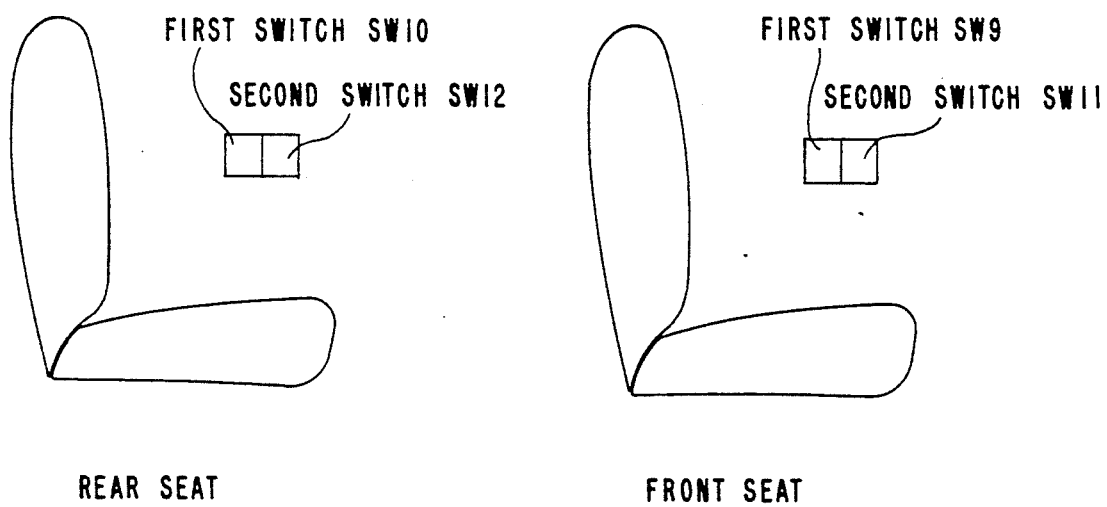
FIG. 14 is a schematic showing illustrating the position of the first and second switches.

FIG. 14 discloses a front switch SW9 and second switch SW11 disposed on a front seat side. Further a first switch SW10 and a second switch SW12 are shown on a rear seat side.

Although the present invention has been described in connection with the preferred embodiments thereof with reference to the accompanying drawings which are used only for the purpose of illustration, not limitation, those skilled in the art will readily conceive numerous changes and modifications within the framework of obviousness upon the reading of the specification presented herein of the present invention. Accordingly, such changes and modifications are, unless they depart from the spirit and scope of the present invention as delivered from the claims annexed hereto, to be construed as included therein.

What is claimed is:

1. A flexible top vehicle having a roof with a roof opening formed therein and surrounded by a front header, a rear header, and roof side rails; and a flexible top composed of a flexible material and disposed at the roof opening; wherein the flexible top is so disposed as to assume a full closed state in which the roof opening is fully covered with the flexible top by extending the flexible top to a full extended length thereof in a longitudinal direction of a vehicle body and to assume a folded state in which a forward portion or/and a rearward portion of the roof opening is/are opened by folding a forward end portion or/and a rearward end portion of the flexible top in the longitudinal direction, said vehicle comprising:
   a first electrically driven motor so disposed as to be associated with said forward end portion of said flexible top for transferring said forward end portion of said flexible top forwards or rearwards;
   a second electrically driven motor so disposed as to be associated with said rearward end portion of said flexible top for transferring said rearward end portion of said flexible top forwards or rearwards;
   a first switch disposed within a vehicle chamber for transferring said flexible top forwards by manual operation;
   a second switch disposed within the vehicle chamber for transferring said flexible top rearwards by manual operation;
   a first control means for controlling said first electrically driven motor and said second electrically driven motor so as to allow said flexible top to assume the folded state, by transferring forward said flexible top located in a generally middle portion of said roof opening while in the folded state, when said first switch is manually turned on; and
   a second control means for controlling said first electrically driven motor and said second electrically driven motor so as to allow said flexible top to assume the folded state, by transferring rearwards said flexible top located in a middle portion of said roof opening while in the folded state, when said second switch is manually turned on.

2. A flexible top vehicle as claimed in claim 1, further comprising a timer for counting a period of time when said first switch and said second switch are turned on;
   wherein said first control means is to control said first electrically driven motor and said second electrically driven motor so as to transfer said forward end portion of said flexible top forwards by operating said first electrically driven motor while said first switch is turned on, to suspend a forward transfer of said forward end portion of said flexible top by suspending the operation of said first electrically driven motor and at the same time to start operation of said second electrically driven motor, thereby transferring said rearward portion of said flexible top forwards, when said first switch is turned off, as well as to suspend operation of said second electrically driven motor to thereby suspend a forward transfer of said rearward end portion of said flexible top when a period of time has been elapsed which is identical to said period of time counted by said timer during which said first switch is turned on; and
   wherein said second control means is to control said first electrically driven motor and said second electrically driven motor so as to transfer said rearward end portion of said flexible top rearwards by operating said second electrically driven motor while said second switch is turned on, to suspend a rearward transfer of said rearward end portion of said flexible top by suspending the operation of said second electrically driven motor and at the same time to start operation of said second electrically driven motor, thereby transferring said rearward end portion of said flexible top rearwards, when said second switch is turned off, as well as to suspend operation of said first electrically driven motor to thereby suspend a rearward transfer of said forward end portion of said flexible top when a period of time has been elapsed which is identical to said period of time counted by said timer during which said second switch is turned on.

3. A flexible top vehicle as claimed in claim 2, wherein:
said first switch is disposed each on a front seat side and on a rear seat side; and
said second switch is disposed each on the front seat side and on the rear seat side.

4. A flexible top vehicle as claimed in claim 1, wherein:
said first control means is to repeatedly control said first electrically driven motor and said second electrically driven motor so as to allow said first electrically driven motor to be operated for a predetermined period of time for a forward transfer of said forward end portion of said flexible top in a predetermined distance and thereafter to allow said second electrically driven motor to be operated for said predetermined period of time for a forward transfer of said rearward end portion of said flexible top in the same predetermined distance as said forward end portion of said flexible top, on condition that said first switch is being turned on; and
said second control means is to repeatedly control said first electrically driven motor and said second electrically driven motor so as to allow said second electrically driven motor to be operated for a predetermined period of time for a rearward transfer of said rearward end portion of said flexible top in a predetermined distance and thereafter to allow said first electrically driven motor to be operated for said predetermined period of time for a rearward transfer of said forward end portion of said flexible top in the same predetermined distance as said rearward end portion of said flexible top, on condition that said second switch is being turned on.

5. A flexible top vehicle as claimed in claim 4, wherein:
said first switch is disposed each on a front seat side and on a rear seat side; and
said second switch is disposed each on the front seat side and on the rear seat side.

6. A flexible top vehicle as claimed in claim 1, further comprising:
a guide rail so disposed to one of said roof side rails as to extend in the longitudinal direction of said vehicle body;
a forward slider so disposed at the forward end portion of said flexible top as to move in said longitudinal direction along said guide rail; and
a rearward slider so disposed at the rearward end portion of said flexible top as to move in said longitudinal direction along said guide rail;
wherein said first electrically driven motor is associated with said forward slider; and
said second electrically driven motor is associated with said rearward slider.

7. A flexible top vehicle as claimed in claim 6, wherein:
said flexible top comprises a forward plate composed of a hard material disposed at the forward end portion thereof and a rearward plate composed of a hard material disposed at the rearward end portion thereof;
said forward slider is mounted to said forward plate; and
said rearward slider is mounted to said rearward plate.

* * * * *